United States Patent
Zones et al.

(10) Patent No.: US 7,153,483 B2
(45) Date of Patent: Dec. 26, 2006

(54) CRYSTALLINE MOLECULAR SIEVE SSZ-51 COMPOSITION OF MATTER AND SYNTHESIS THEREOF

(75) Inventors: Stacey I. Zones, San Francisco, CA (US); Allen W. Burton, Richmond, CA (US); Thomas V. Harris, Benicia, CA (US); Lucy M. Bull, Pinole, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 581 days.

(21) Appl. No.: 10/691,857

(22) Filed: Oct. 22, 2003

(65) Prior Publication Data

US 2005/0090389 A1   Apr. 28, 2005

(51) Int. Cl.
C01B 37/04    (2006.01)
C01B 37/06    (2006.01)
C01B 37/08    (2006.01)

(52) U.S. Cl. .................. 423/305; 423/306; 423/706; 423/708; 423/718; 423/DIG. 30; 502/208; 502/214

(58) Field of Classification Search ............... 423/718, 423/706, 708, 305, 306, DIG. 30; 502/208, 502/214
See application file for complete search history.

(56) References Cited

U.S. PATENT DOCUMENTS

| | | | | |
|---|---|---|---|---|
| 4,310,440 A | * | 1/1982 | Wilson et al. | 502/208 |
| 4,440,871 A | * | 4/1984 | Lok et al. | 502/214 |
| 4,657,029 A | * | 4/1987 | Helm et al. | 460/106 |
| 5,187,132 A | * | 2/1993 | Zones et al. | 502/64 |
| 2004/0265204 A1 | * | 12/2004 | Strohmaier et al. | 423/305 |
| 2006/0074267 A1 | * | 4/2006 | Cao et al. | 585/640 |

* cited by examiner

*Primary Examiner*—David Sample
(74) *Attorney, Agent, or Firm*—Richard J. Sheridan

(57) ABSTRACT

A novel crystalline aluminophosphate and metalloaluminophosphate of the molecular sieve type, denominated SSZ-51, is prepared by hydrothermal synthesis from reactive sources of aluminum and phosphorus, fluorine and an organic templating agent, 4-dimethylaminopyridine.

8 Claims, 3 Drawing Sheets

CRYSTALLINE MOLECULAR SIEVE SSZ-51 COMPOSITION OF MATTER AND SYNTHESIS THEREOF

FIELD OF INVENTION

The present invention relates in general to crystalline aluminophosphate compositions, and more particularly to novel crystalline aluminophosphates and metalloaluminophosphates of the molecular sieve type, and to the methods of their preparation.

BACKGROUND OF THE INVENTION

Microporous crystalline aluminophosphate compositions having open framework structures formed of $AlO_2$ and $PO_2$ tetrahedral units joined by the sharing of the corner oxygen atoms and characterized by having pore openings of uniform dimensions have heretofore been disclosed in a number of publications, notably the specification of U.S. Pat. No. 4,310,440 issued Jul. 7, 1980, to S. T. Wilson et al. The Wilson et al. aluminophosphates constitute a generic class of non-zeolitic molecular sieve materials which are capable of undergoing complete and reversible dehydration while retaining the same essential framework topology in both the anhydrous and hydrated state. By the term "essential framework topology" or "essential framework structure" as used in the aforesaid patent, and also in the present specification and claims, is meant the spatial arrangement of the primary Al—O and P—O bond linkages. Other microporous aluminophosphates which undergo structure rearrangements, either reversibly or irreversibly, upon partial or complete dehydration are also known, for example the minerals variscite and metavariscite and certain of the synthetic metastable aluminophosphates reported by F. D'Yvoire [Bull. Soc. Chim. France, 1762 (1961)]. Another class of synthetic crystalline compositions contain framework tetrahedral metal oxides of manganese, magnesium, cobalt, and/or zinc in addition the $AlO_2$ and $PO_2$ tetrahedra. These are sometimes termed metalloaluminophosphates or MAPO'S.

SUMMARY OF THE INVENTION

The present invention provides novel microporous crystalline aluminophosphates ("ALPO's"), aluminosilicophosphates ("APSO's") metalloaluminophosphates ("MAPO's") and metalloaluminosilicophosphates ("MAPSO's") denominated SSZ-51 and the methods for its preparation. SSZ-51 has an essential framework structure whose chemical composition, expressed in terms of mole ratios after calcination, is:

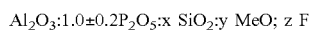

$Al_2O_3$:1.0±0.2$P_2O_5$:x $SiO_2$:y MeO; z F where x has a value of 0 to 0.2 and y has a value of 0 to 0.2, z has a value of 0 to 0.10 and Me represents at least one element, other than aluminum, phosphorus or silicon, which is capable of forming an oxide in coordination with ($AlO_2$) and ($PO_2$) oxide structural units in the molecular sieve (such as a divalent metal). After calcination and in the hydrated form, SSZ-51 exhibits an X-ray powder diffraction pattern which contains at least the d-spacings set forth in Table II set forth hereinafter.

The framework structure of SSZ-51 consists of a building unit which is essentially a double four ring (D4R) with one disconnected (or ring-opened) edge. The fluoride ion used in synthesizing SSZ-51 is encapsulated within this building unit and forms a bridge between two of the aluminum atoms. Each building unit is then connected to four other identical building units, through two Al—O—P linkages per unit. These building units can be linked together to form the two structures, the SSZ-51 structure of this invention and a material having the structure designated AFR (e.g., SAPO-40). The building units can be joined in a "head-to-tail" fashion to form chains running parallel to the c-direction. Chains are linked together through four-rings to form undulating layers. The orientation of successive chains in these layers is anti-parallel. This layer is a building block of both SSZ-51 and AFR. The undulating layers can be linked in two ways. If the layers are linked so that there is inversion symmetry between the layers, this results in the SSZ-51 structure. If the layers are linked so that there is "mirror" symmetry between the layers the resulting structure is that of AFR (mirror symmetry here refers to the framework, i.e., excludes the need for Al/P ordering).

SSZ-51 can be prepared by hydrothermal crystallization from a reaction mixture containing in addition to water, a reactive source of aluminum, phosphorus and fluoride and an organic templating agent (sometimes referred to as a structure directing agent or "SDA") which is 4-dimethylaminopyridine. Thus, the present invention further provides a method of preparing a crystalline material comprising contacting under crystallization conditions a reaction mixture comprising a reactive source of aluminum, a reactive source of phosphorus, a reactive source of fluoride and an organic templating agent comprising 4-dimethylaminopyridine. The reaction mixture may further comprise a reactive source of a metal selected from the group consisting of magnesium, manganese, cobalt, zinc and nickel.

Thus, the present invention provides a molecular sieve whose chemical composition, expressed in terms of mole ratios of oxides after calcination, is:

$Al_2O_3$: 1.0±0.2$P_2O_5$:x $SiO_2$:y MeO; z F where x has a value of 0 to 0.2, y has a value of 0 to 0.2, z has a value of 0 to 0.10 and Me represents at least one element, other than aluminum, phosphorus or silicon, which is capable of forming an oxide in coordination with ($AlO_2$) and ($PO_2$) oxide structural units in the molecular sieve, the molecular sieve having, after calcination and in a hydrated state, the X-ray diffraction lines of Table II.

The present invention further provides such a molecular sieve wherein Me is selected from the group consisting of magnesium, manganese, cobalt, zinc and nickel.

Further provided by the present invention is a molecular sieve composition, as-synthesized, whose general formula, in terms of mole ratios, is as follows:

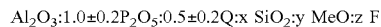

$Al_2O_3$:1.0±0.2$P_2O_5$:0.5±0.2Q:x $SiO_2$:y MeO:z F where x has a value of 0 to 0.2, y has a value of 0 to 0.2, Q is 4-dimethylaminopyridine, z has a value of 0.02 to 0.50 and Me represents at least one element, other than aluminum, phosphorus or silicon, which is capable of forming an oxide in coordination with ($AlO_2$) and ($PO_2$) oxide structural units in the molecular sieve.

The present invention also provides such an as-synthesized molecular sieve wherein Me is selected from the group consisting of magnesium, manganese, cobalt, zinc and nickel.

Also provided by the present invention is such an as-synthesized molecular sieve having, in an anhydrous state, the X-ray diffraction lines of Table I.

DETAILED DESCRIPTION OF THE INVENTION

Figure 1:
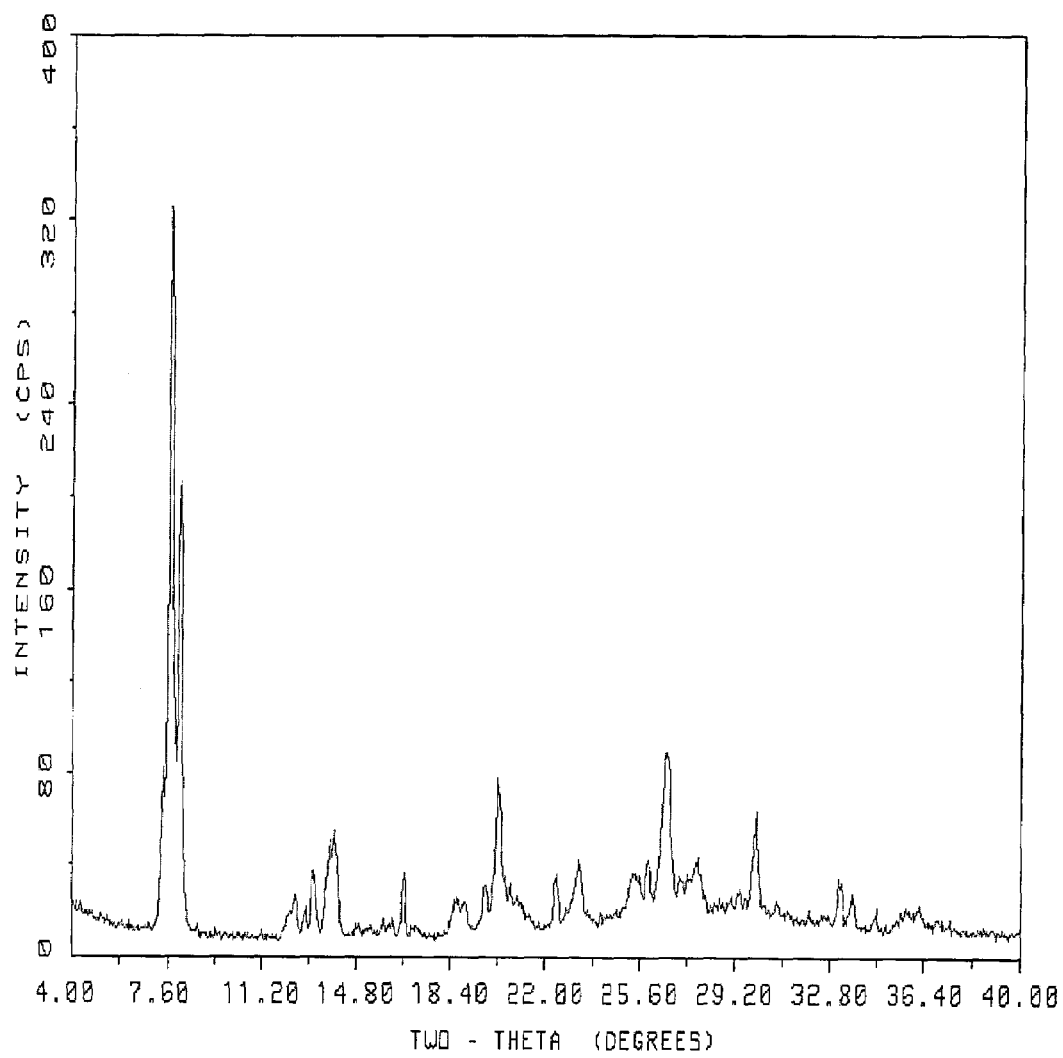
FIG. 1 is an X-ray pattern (CuKα) of calcined and hydrated SSZ-51.

The novel microporous aluminophosphate (or MAPO) of the present invention can be produced by hydrothermal crystallization from a reaction mixture containing reactive sources of phosphorus and aluminum and an organic templating agent (4-dimethylaminopyridine), a source of HF and, optionally, additional divalent metals or sources of silica. The preparative process typically comprises forming a reaction mixture which in terms of mole ratios is:

where Q is the organic templating agent 4-dimethylaminopyridine. The reaction mixture is placed in a reaction vessel inert toward the reaction mixture and heated at a temperature of at least about 100° C., preferably between 100° C. and 300° C., until crystallized, usually a period of from 2 hours to 2 weeks. The solid crystalline reaction product is then recovered by any convenient method, such as filtration or centrifugation, washed with water and dried in air at a temperature between ambient and about 100° C. In a preferred crystallization method, the source of phosphorus is phosphoric acid, and the source of aluminum is a hydrated aluminum oxide of the trade name Catapal, the temperature is 150° C. to 200° C., the crystallization time is from 2 to 7 days, and the ratio of compounds in the reaction mixture is

The templating agent is 4-dimethylaminopyridine having the structure

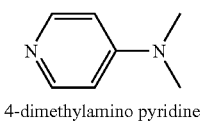

4-dimethylamino pyridine and is present in the reaction mixture in an amount of from about 0.5 to 0.75 moles per mole of alumina. Additionally present may be sources of divalent metals such as magnesium, manganese, cobalt, zinc, nickel and so forth. In these instances it is anticipated that these metals will replace Al in the lattice so the amount of Al provided in the synthesis is reduced accordingly. Silica may also be introduced into the reaction. Typically, silicon will replace P in the lattice, so the amount of P provided in the synthesis is reduced accordingly.

The template-containing as-synthesized form of SSZ-51 has an essential framework structure whose chemical composition expressed in terms of mole ratios is:

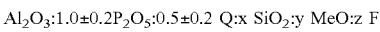

where x, y, Me and z are as defined above. As-synthesized SSZ-51, in an anhydrous state, has a characteristic X-ray powder diffraction pattern which contains at least the d-spacings set forth in Table I below.

TABLE I

Characteristic peaks of as-synthesized SSZ-51

| 2 Theta[a] | d-spacing (Angstroms) | Relative Intensity (%)[b] |
|---|---|---|
| 7.6 | 11.7 | S |
| 8.2 | 10.8 | VS |
| 13.9 | 6.4 | VS |
| 14.1 | 6.3 | S |
| 18.9 | 4.7 | W |
| 19.1 | 4.6 | W–M |
| 19.7 | 4.5 | S |
| 20.0 | 4.4 | W–M |
| 25.8 | 3.5 | S |
| 26.1 | 3.42 | M |

[a] ±0.1
[b] The X-ray patterns provided are based on a relative intensity scale in which the strongest line is assigned a value of 100: W (weak) is less than 20; M (medium) is between 20 and 40; S (strong) is between 40 and 60; VS (very strong) is greater than 60.

The complete X-ray powder diffraction pattern, including actual relative intensities, for anhydrous, as-synthesized SSZ-51 is set forth in Table IA below.

TABLE IA

Peaks of as-synthesized SSZ-51

| 2 Theta | d-spacing (Angstroms) | Relative Intensity (%) |
|---|---|---|
| 7.56 | 11.69 | 53.8 |
| 8.18 | 10.81 | 100.0 |
| 12.52 | 7.07 | 15.3 |
| 12.78 | 6.93 | 4.6 |
| 13.88 | 6.38 | 85.4 |
| 14.09 | 6.28 | 48.0 |
| 15.22 | 5.82 | 11.2 |
| 16.46 | 5.39 | 6.6 |
| 18.94 | 4.69 | 17.2 |
| 19.10 | 4.65 | 21.6 |
| 19.70 | 4.51 | 52.2 |
| 20.02 | 4.44 | 19.3 |
| 20.96 | 4.24 | 6.4 |
| 21.62 | 4.11 | 3.2 |
| 22.28 | 3.99 | 4.0 |
| 22.62 | 3.93 | 4.9 |
| 22.94 | 3.88 | 15.2 |
| 23.30 | 3.82 | 6.4 |
| 24.88 | 3.58 | 3.4 |
| 25.32 | 3.52 | 8.1 |
| 25.78 | 3.46 | 51.3 |
| 26.08 | 3.42 | 22.4 |
| 26.74 | 3.33 | 10.7 |
| 27.10 | 3.29 | 7.5 |
| 27.86 | 3.20 | 9.9 |
| 28.42 | 3.14 | 3.7 |
| 28.80 | 3.10 | 3.3 |
| 29.14 | 3.06 | 4.2 |
| 29.44 | 3.03 | 6.9 |
| 29.72 | 3.01 | 6.4 |
| 30.56 | 2.93 | 8.2 |
| 30.84 | 2.90 | 6.2 |

TABLE IA-continued

Peaks of as-synthesized SSZ-51

| 2 Theta | d-spacing (Angstroms) | Relative Intensity (%) |
|---|---|---|
| 31.64 | 2.83 | 2.7 |
| 32.4 | 2.76 | 5.3 |

When the as-synthesized SSZ-51 compositions are calcined, i.e., heated at a temperature sufficiently high, typically between about 300° C. and about 700° C., or otherwise treated, such as by chemical oxidation, to remove essentially all of the organic templating agent present in the intracrystalline pore system and then rehydrated, the composition has an X-ray powder diffraction pattern which contains at least the d-spacings set forth in Table II below:

TABLE II

Characteristic peaks of calcined and hydrated SSZ-51

| 2 Theta | d-spacing (Angstroms) | Relative Intensity (%) |
|---|---|---|
| 7.70 | 11.51 | VS |
| 8.08 | 10.9 | VS |
| 13.18 | 6.7 | W |
| 13.80 | 6.4 | W |
| 14.02 | 6.3 | W |
| 16.64 | 5.32 | W |
| 20.20 | 4.39 | M |
| 22.44 | 3.96 | W |
| 23.28 | 3.82 | W |
| 26.62 | 3.35 | M |
| 30.02 | 2.97 | W–M |

A complete X-ray powder diffraction pattern (synchrotron, 0.704 Angstrom), including actual relative intensities, for calcined, rehydrated SSZ-51 is set forth in Table IIA below. Intensities were determined by LeBail intensity extraction of the pattern.

TABLE IIA

Peaks of calcined, rehydrated SSZ-51

| 2 Theta | d-spacing (Angstroms) | Relative Intensity (%) |
|---|---|---|
| 3.45 | 11.7 | 100 |
| 3.63 | 11.1 | 63 |
| 5.81 | 6.95 | 12.2 |
| 5.87 | 6.87 | 2.7 |
| 6.19 | 6.52 | 9.9 |
| 6.52 | 6.19 | 13.2 |
| 6.98 | 5.78 | 1.3 |
| 7.27 | 5.54 | 1.9 |
| 7.92 | 5.10 | 2.3 |
| 8.61 | 4.69 | 10.7 |
| 8.68 | 4.65 | 5.7 |
| 9.00 | 4.48 | 23.2 |
| 9.36 | 4.32 | 14.8 |
| 9.55 | 4.23 | 4.6 |
| 10.02 | 4.03 | 3.1 |
| 10.36 | 3.90 | 10.2 |
| 10.45 | 3.87 | 2.1 |
| 11.57 | 3.49 | 10.9 |
| 11.76 | 3.43 | 7.4 |
| 11.87 | 3.40 | 15.6 |
| 12.29 | 3.29 | 1.9 |
| 12.38 | 3.26 | 5.0 |
| 12.67 | 3.19 | 5.9 |
| 12.78 | 3.16 | 2.9 |

The room temperature powder X-ray diffraction pattern of SSZ-51 changes dramatically after calcination to remove the occluded organic SDA and fluoride ions. There seems to be a distinct loss of crystallinity, with diffraction peaks for the calcined sample being much broader and less well defined than for the uncalcined sample. It would appear that the calcination procedure has probably resulted in some breakdown of the framework structure. However, calcined SSZ-51 possesses appreciable microporosity (close to FAU-type zeolites), and the density functional theory (DFT) measurements indicate the likely presence of 12- and 8-rings. This is consistent with the removal of fluoride and SDA while retaining the framework structure intact. These two results are therefore seemingly at odds. In order to follow the calcination process, variable temperature powder X-ray diffraction data on the as-made sample was collected in order to monitor structural changes as SSZ-51 is heated in air.

Figure 3:
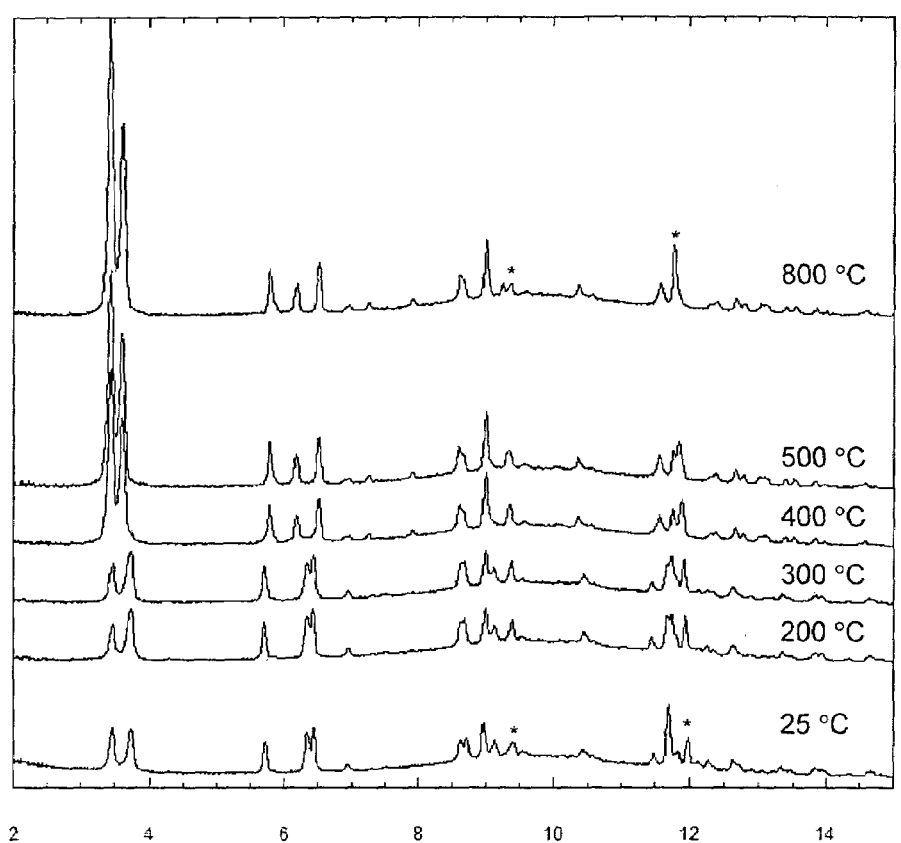
FIG. 3 is a series of X-ray patterns (synchrotron, 0.704 Angstrom) of as-made SSZ-51 as it is being calcined. The * indicates berlinite peaks.

FIG. 3 shows the effect of temperature on the powder diffraction pattern of the as-made sample of SSZ-51. The data were collected at a synchrotron with a wavelength of about 0.704 Angstrom with samples in rotating capillaries. Note the presence of peaks due to berlinite (the AlPO analogue of quartz). As the material is heated to 300° C., there are only slight changes in the XRD pattern. However, at 400° C. there are dramatic changes in both the peak positions and intensities as the SDA and fluoride are removed from the structure. The shifts are readily apparent in the positions of the (110), (200), and (310) reflections. This XRD pattern can be indexed by a C-centered monoclinic cell with lattice parameters of a=22.4, b=13.7, c=14.0, $\beta$=98.5° (as verified by a LeBail profile fit). While the other lattice parameters show little change, the a lattice parameter increases by 3.3%. This change seems mostly due to the relaxation of the framework as the fluoride bonds with the framework are broken.

After 400° C., there is little variation in the pattern due to structural changes in SSZ-51.

Figure 2:
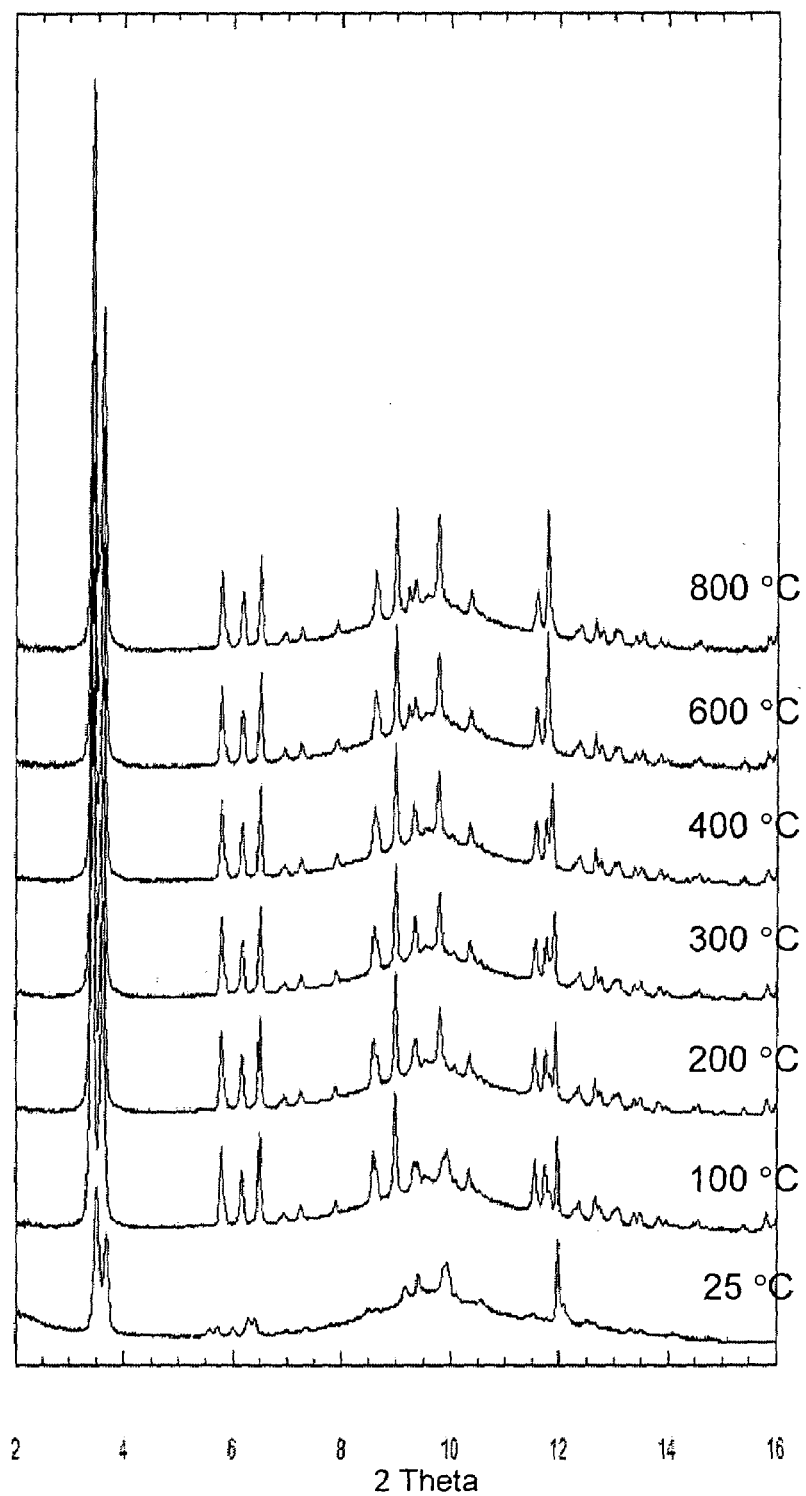
FIG. 2 is a series of X-ray patterns (synchrotron, 0.704 Angstrom) illustrating the change in the pattern as calcined and rehydrated SSZ-51 is dehydrated.

The good thermal stability of SSZ-51 is quite surprising in that the material survives calcination to 800° C. while retaining a quite crystalline structure. This is at odds with the room temperature XRD pattern, which shows a distinct loss of crystallinity. This change in XRD pattern must then be due to the rehydration of the framework rather than any inherent thermal instability of the framework. On leaving the calcined SSZ-51 in moist air for a day the broad diffraction pattern of FIG. 2 is again recorded. However, on heating the sample to 100° C., the diffraction pattern reverts to that which we expect for a highly crystalline sample of SSZ-51, with most of the expected reflections from the unit cell distinctly visible. It would appear that the rehydration process affects the crystallinity of the SSZ-51 framework markedly. A similar effect is seen in the thermal treatment of SAPO-40, which has the related AFR framework structure described above. Once again, the structure of the framework is grossly changed by the addition of water at room temperature, removing the long range order in the structure and producing an X-ray diffraction containing broad Bragg peaks. In both SSZ-51 and SAPO-40, this behavior is probably closely linked to the addition of water to the framework aluminum atoms, producing 5- and perhaps 6-coordinated aluminum atoms and so distorting the structure away from that found for the dehydrated framework.

X-ray diffraction data was collected at a synchrotron source with a wavelength of about 0.704 Angstrom. Interplanar spacings (d) in Angstrom units are obtained from the position of the diffraction peaks expressed as 2θ (theta) as observed on the strip chart where theta is the Bragg angle. Intensities were determined from the heights of diffraction peaks after subtracting background, "$I_o$" being the intensity of the strongest line or peak, and "I" being the intensity of each of the other peaks.

As will be understood by those skilled in the art the determination of the parameter 2 theta, irrespective of the technique employed, is subject to both human and mechanical error, which in combination, can impose an uncertainty of about 0.1° on each reported value of 2 theta. This uncertainty is, of course, also manifested in the reported value of the d-spacings, which are calculated from the 2 theta values. This imprecision is general throughout the art and is not sufficient to preclude the differentiation of the present crystalline materials from the compositions of the prior art. In some of the X-ray patterns reported, the relative intensities of the d-spacings are indicated by the notations VS, S, M, and W which represent Very Strong, Strong, Medium, and Weak, respectively.

SSZ-51 exhibits surface characteristics which make it useful as a catalyst or catalyst support in various hydrocarbon conversion and oxidative combustion processes. SSZ-51 can be associated with catalytically active metals, e.g., by framework substitution, by impregnation, doping and the like, by methods traditionally used in the art for the fabrication of catalyst compositions.

Further, SSZ-51 has a pore size of less than about 8 Angstroms which makes SSZ-51 suitable for use as a molecular sieve for the separation of molecular species. In addition, SSZ-51 is useful in catalysts for hydrocarbon conversion reactions such as hydrocracking, dewaxing and the like.

The following examples are provided to illustrate the invention and are not to be construed as limiting thereof:

EXAMPLE 1

Synthesis of SSZ-51

SSZ-51 is prepared by combining 1.33 grams of a hydrated aluminum oxide, a pseudo-boehmite phase comprising 75.1 weight percent $Al_2O_3$ and 24.9 weight percent $H_2O$, with a solution of 2.2 grams of 85 wt % orthophosphoric acid ($H_3PO_4$) and 9 grams of $H_2O$. The resulting mixture is stirred until a homogeneous mixture is observed. This mixture is then mixed with 0.22 grams of 50% HF and the resulting mixture stirred until homogeneous. To the above mixture 0.90 grams of 4-dimethylaminopyridine (DMAP) is added and then 0.06 grams of Cabosil M-5 amorphous fumed silica and the resultant mixture is once again mixed until homogeneous. The composition of reaction mixture in molar ratios is:

0.75DMAP:$Al_2O_3$:$P_2O_5$:0.5HF:0.1$SiO_2$:50$H_2O$

The reaction mixture is sealed in a stainless steel pressure vessel lined with polytetrafluoroethylene and heated in an oven at 180° C. at autogenous pressure for 50 hours. The solid reaction product is recovered by filtration, washed with water and dried in air at ambient temperature.

A portion of the solid reaction product is analyzed and the following chemical analysis obtained:

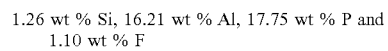

1.26 wt % Si, 16.21 wt % Al, 17.75 wt % P and 1.10 wt % F

The organic content was not obtained in this analysis.

The solid reaction product is analyzed by X-ray powder diffraction and found to be SSZ-51.

EXAMPLES 2–9

Synthesis of SSZ-51

In a manner similar to Example 1, SSZ-51 is prepared using the starting materials and conditions shown in Table A below. Elemental analysis for some of the products is shown in Table B below where the numbers are weight percent.

TABLE A

| Ex. No. | $H_2O$ | HF | $H_3PO_4$ | Cabosil M-5 or metal | DMAP | $Al_2O_3$[1] | Temp., ° C. | Time (Days) |
|---|---|---|---|---|---|---|---|---|
| 2 | 9 g | 0.33 g | 2.20 g | 0.06 g[2] | 0.90 g | 1.33 g | 180 | 2.5 |
| 3 | 9 g | 0.33 g | 2.20 g | 0.12 g[2] | 0.90 g | 1.33 g | 180 | 6 |
| 4 | 9 g | 0.22 g | 2.0 g | Co[3] | 1.20 g | 1.33 g | 180 | 2.5 |
| 5 | 9 g | 0.33 g | 2.2 g | Co[3] | 0.90 g | 1.20 g | 180 | 2.5 |
| 6 | 9 g | 0.22 g | 2.2 g | Co[3] | 0.90 g | 1.26 g | 180 | 2.5 |
| 7 | 9 g | 0.22 g | 2.2 g | Ni[3] | 0.90 g | 1.26 g | 160 | 4 |
| 8 | 9 g | 0.22 g | 2.2 g | Zn[3] | 0.90 g | 1.26 g | 160 | 4 |
| 9 | 9 g | 0.22 g | 2.2 g | Mg[3] | 0.90 g | 1.26 g | 160 | 4 |

[1]Hydrated aluminum oxide, 75.1 wt. % $Al_2O_3$ and 24.9 wt. % $H_2O$
[2]Cabosil M-5
[3]1 mmole added as nitrate salt

TABLE B

| Ex. No. | Al | P | Si | Co | F | Ni | Zn | Mg |
|---|---|---|---|---|---|---|---|---|
| 1 | 16.1 | 17.75 | 1.26 | | 1.10 | | | |
| 5 | 15.95 | 19.72 | | 1.91 | 2.33 | | | |
| 7 | 14.94 | 18.79 | | | 2.12 | 3.08 | | |
| 8 | 14.57 | 20.06 | | | 1.74 | | 1.73 | |
| 9 | 16.92 | 20.20 | | | 1.46 | | | 0.34 |

COMPARATIVE EXAMPLE A

A reaction is conducted using the reactants and procedure of Example 1, except that no HF was used. The crystalline product is determined by X-ray analysis to be SAPO-5. This example demonstrates that, when HF is left out of the reaction mixture, SAPO-5 is the product rather than SSZ-51.

EXAMPLE 10

Unit Cell from Synchrotron Data

Data is collected on the product of Example 1 with the following experimental parameters: A wavelength of 0.6875 Angstroms (Silicon 111 monochromator) is used in conjunction with Bruker-Nonius goniometer equipped with a 1K CCD area detector and temperature controlled to 150° K. The determination is made that the crystalline solid has, for a monoclinic, C2/c space group the following lattice parameters:

a=21.759(3) Angstroms
b=13.8214(18) Angstroms, Beta=98.849(4) deg.
c=14.2237 (18) Angstroms.

EXAMPLE 11

Calcination of SSZ-51

The material from Example 1 is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for 5 hours, after which it is increased to 594° C. and held there for another 5 hours. A 50/50 mixture of air and nitrogen is passed over the SSZ-51 at a rate of 20 standard cubic feet per minute during heating.

EXAMPLE 12

Argon Adsorption Analysis

SSZ-51 has a micropore volume (t-plot) of 0.25 cc/gm based on argon adsorption isotherm at 87.3 K recorded on ASAP 2010 equipment from Micromeritics. The low-pressure dose was 2.00 cm$^3$/g (STP) with 15-s equilibration interval. The argon adsorption isotherm is analyzed using the density function theory (DFT) formalism and parameters developed for activated carbon slits by Olivier (*Porous Mater.* 1995, 2, 9) using the Saito Foley adaptation of the Horvarth-Kawazoe formalism (*Microporous Materials,* 1995, 3, 531) and the conventional t-plot method (*J. Catalysis,* 1965, 4, 319). The DFT analysis also shows that SSZ-51 has at least one large pore.

EXAMPLE 13

Calcination of SSZ-51

The product of Example 6 is calcined in the manner described in Example 11.

EXAMPLE 14

Constraint Index Determination

The hydrogen form of the SSZ-51 of Example 13 is pelletized at 2–3 KPSI, crushed and meshed to 20–40, and then >0.50 gram is calcined at about 540° C. in air for four hours and cooled in a desiccator. 0.50 Gram is packed into a ⅜ inch stainless steel tube with alundum on both sides of the molecular sieve bed. A Lindburg furnace is used to heat the reactor tube. Helium is introduced into the reactor tube at 10 cc/min. and at atmospheric pressure. The reactor is heated to about 800° F. (427° C.), and a 50/50 (w/w) feed of n-hexane and 3-methylpentane is introduced into the reactor at a rate of 8 µl/min. Feed delivery is made via a Brownlee pump. Direct sampling into a gas chromatograph begins after 10 minutes of feed introduction. The Constraint Index value is calculated from the gas chromatographic data using methods known in the art. SSZ-51 has a Constraint Index of 0.4–0.5 at a feed conversion of 40% at 800° F. (427° C.) after 10 minutes. The Constraint Index dropped with time on stream. The Constraint Index values over this period continue to show large pore molecular sieve behavior.

EXAMPLE 15

Hydrocracking of n-Hexadecane

A sample of SSZ-51 as prepared in Example 13 is impregnated with Pd(NH$_3$)$_4$(NO$_3$)$_2$ salt using water and giving a 0.5 wt. % Pd value with respect to the dry weight of the molecular sieve sample. This slurry is stirred for 48 hours at room temperature. After cooling, the slurry is filtered through a glass frit, washed with de-ionized water, and dried at 100° C. The catalyst is then calcined slowly up to 482° C. (900° F.) in air and held there for three hours.

The calcined catalyst is pelletized in a Carver Press and crushed to yield particles with a 20/40 mesh size range. Sized catalyst (0.5 g) is packed into a ¼ inch OD tubing reactor in a micro unit for n-hexadecane hydroconversion.

A balance of isomerization and cracking is observed as the catalyst is taken through a regime of 30% conversion at 600° F. (315° C.) to 90% at 667° F. (353° C.). The cracking increases with temperature. The test is run at a WHSV of 1.55 at 1200 psig and without titration. Very little C$_1$ and C$_2$ are observed and the iso/n ratios for C$_4$ and larger are indicative of large pore selectivity.

What is claimed is:

1. A molecular sieve whose chemical composition, expressed in terms of mole ratios of oxides after calcination, is:

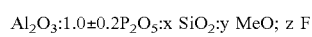

$Al_2O_3:1.0\pm0.2P_2O_5:x\ SiO_2:y\ MeO;\ z\ F$ where x has a value of 0 to 0.2, y has a value of 0 to 0.2, z has a value of 0 to 0.10 and Me represents at least one element, other than aluminum, phosphorus or silicon, which is capable of forming an oxide in coordination with (AlO$_2$) and (PO$_2$) oxide structural units in the molecular sieve, the molecular sieve having, after calcination and in a hydrated state, the X-ray diffraction lines of Table II.

2. The molecular sieve of claim 1 wherein Me is selected from the group consisting of magnesium, manganese, cobalt, zinc and nickel.

3. A molecular sieve composition, as-synthesized, whose general formula, in terms of mole ratios, is as follows:

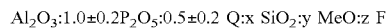

$Al_2O_3:1.0\pm0.2P_2O_5:0.5\pm0.2\ Q:x\ SiO_2:y\ MeO:z\ F$ where x has a value of 0 to 0.2, y has a value of 0 to 0.2, Q is 4-dimethylaminopyridine, z has a value of 0.02 to 0.50 and Me represents at least one element, other than aluminum, phosphorus or silicon, which is capable of forming an oxide in coordination with ($AlO_2$) and ($PO_2$) oxide structural units in the molecular sieve.

4. The molecular sieve of claim 3 wherein Me is selected from the group consisting of magnesium, manganese, cobalt, zinc and nickel.

5. The molecular sieve of claim 3 having, in an anhydrous state, the X-ray diffraction lines of Table I.

6. The molecular sieve of claim 4 having, in an anhydrous state, the X-ray diffraction lines of Table I.

7. A method of preparing a crystalline material comprising contacting under crystallization conditions a reaction mixture comprising a reactive source of aluminum, a reactive source of phosphorus, a reactive source of fluoride and an organic templating agent comprising 4-dimethylaminopyridine.

8. The method of claim 7 wherein the reaction mixture further comprises a reactive source of a metal selected from the group consisting of magnesium, manganese, cobalt, zinc and nickel.

* * * * *